July 8, 1958 G. Q. RIPLEY, JR 2,842,347
AERATING DEVICE
Filed Dec. 21, 1953
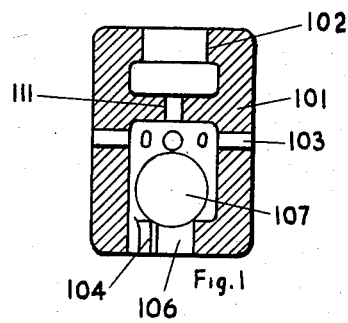
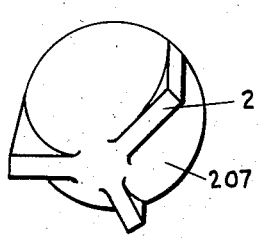
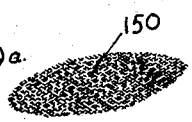
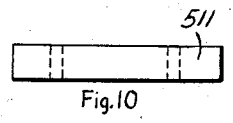
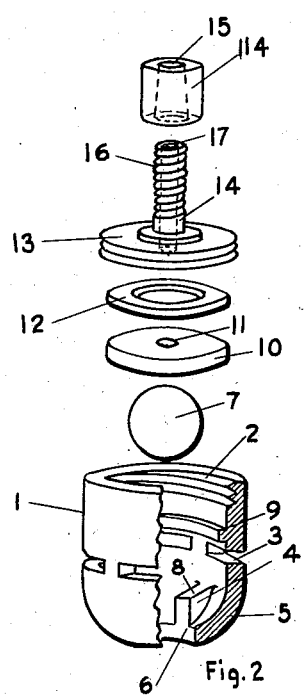
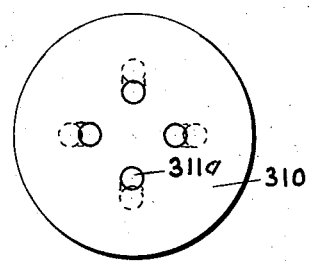
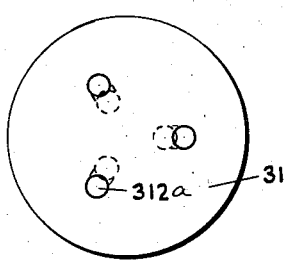
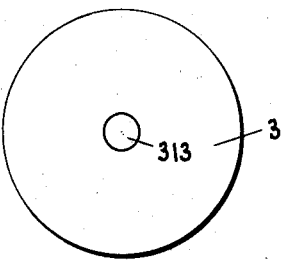
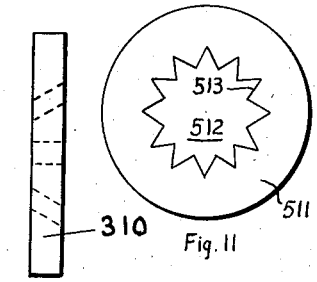
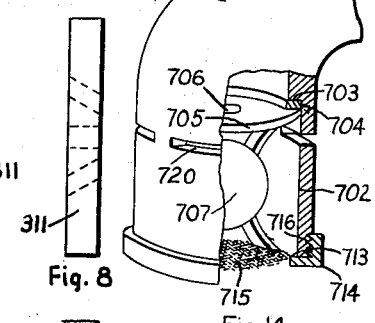
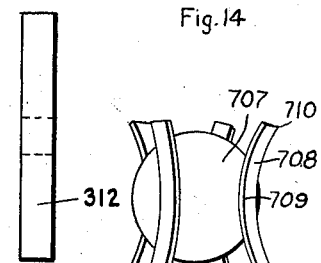
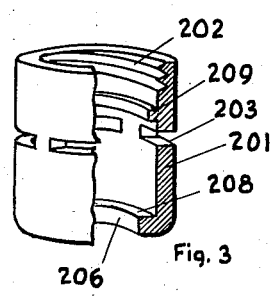
Inventor
Glenn Q. Ripley Jr
By
Charles L. Loverchick
Attorney

United States Patent Office 2,842,347
Patented July 8, 1958

2,842,347

AERATING DEVICE

Glenn Q. Ripley, Jr., Girard Township, Erie County, Pa.

Application December 21, 1953, Serial No. 399,189

7 Claims. (Cl. 261—76)

This invention relates to attachments for faucets and more particularly to attachments for faucets wherein a quantity of air is introduced and dispersed in the stream of water flowing therefrom to purify the water and to prevent the water from splashing when it enters a container and the water is aerated when the device is used in a shower.

In attachments for faucets made according to prior inventions and with which I am familiar, the design of the appliance was usually complicated and utilized a plurality of screens therein to break up the jet of water into small particles and to allow air to be mingled therewith. The screens were subject to clogging due to deposits in the water and from the piping of the plumbing system.

It is, accordingly, an object of my invention to overcome the above and other defects in prior faucets and more particularly an object to provide an aerator for a faucet or conduit which is simple in construction, economical in manufacture, and efficient in use.

Another object of my invention is to provide an attachment which can be utilized in the conventional type of existing faucet.

Another object of my invention is to provide an attachment for a faucet which can be utilized on specially made faucets having a threaded end adapted to be attached to the device.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is a transverse cross sectional view of a modified form of my invention;

Fig. 2 is an exploded view of the faucet attachment according to my invention;

Fig. 3 is a modified form of attachment for use in an assembly similar to the one shown in Fig. 2;

Figs. 4, 5, and 6 are modified views of orifice disks similar to those shown in Fig. 2;

Figs. 7, 8, and 9 are side views of the orifice disks shown in Figs. 4, 5, and 6, respectively;

Figs. 10 and 11 are views of a modified design of orifice support;

Fig. 12 is another embodiment of the water dispersing device shown in Fig. 2 for use with the device shown in Fig. 3;

Fig. 13 is a view of a screen;

Figs. 14 and 15 disclose another embodiment of my aerator.

Now with more specific reference to the drawings, I show in Fig. 2 a body member 1 with threads 2 suitable for attaching to a faucet having a threaded end with complementary threads therein. The body member 1 has spaced peripheral slots 3 to provide for the admission of air and ledges 4 are integral with the inside of the body member 1 and conform to the converging wall 5 which terminates in the discharge orifice 6. A ball or spherical shaped member 7 is adapted to rest on the top 8 of the ledges 4 and an internal peripheral ledge 9 is provided to support the orifice disk 10 which has a central axial hole 11 therein to admit the limited amount of water to the device. A spacing gasket or washer 12 made of resilient material is provided to rest on top of the disk 10 and a threaded disk shaped member 13 is attached to the screw 14 and adapted to mate with the threads 2 when the device is used in a conventional type of faucet. The disk member 13 and screw 14 may be one piece. A hollow cylindrical member 114 made of rubber or other resilient material has a tapered internal bore 15 adapted to receive the threaded end 16 of the member 14. Instead of the threads, the member 14 could be smooth and could slidingly engage the tapered bore 15. The member 14 has an axial hole 17 therein.

During operation, when the device is to be attached to a conventional type of faucet, the ball 7 is inserted to rest on the ledges 4 and the orifice disk 10 rests on the ledge 9. The spacing washer 12 is put in place and the threaded disk 13 engaged with the threads 2 of the body member 1. The rubber cylindrical member 114 is then inserted in the interior of a conventional faucet and the threaded member 16 screwed thereinto to expand the tapered cylinder 114 into sealing and gripping engagement with the inside of the faucet. The water will then, when turned on, flow through the hole 17, through the hole 11, and impinge on the ball 7 to be dispersed and air will be drawn through the slots 3 and mixed with the water.

In the embodiment of my invention shown in Fig. 1, I show a rubber cylindrical body 101 having a faucet receiving member 102 adapted to frictionally engage a faucet. Peripheral slots 103 are provided in the outer surface of the member 102 and ledges 104 are provided on the interior of the discharge orifice 106. A ball 107 is adapted to be supported on the ledge 104 and an orifice 111 is provided to admit water from the faucet attached thereto. Instead of the integral partition through which the orifice 111 extends, the partition could be made of a separable washer.

During operation, water from the faucet is introduced through the orifice 111 and it draws air through the slots 103 and the water is driven against the top of the ball 107 to splash therefrom and mix with the air entering the slots 103. The mixture of air and water is then discharged through the orifice 106.

In the embodiment of the invention shown in Fig. 3, I show a body 201 having slots 203 therein and having internal threads 202 in the upper end thereof. A discharge orifice 206 is provided which is surrounded by a ledge 208 to cooperate with the ball 207 which is supported by means of legs 209a on the ledge 208. A disk 312 similar to disk 10 will be supported on the ledge 209 and the disk may be provided with a central aperture 313.

During operation, water is introduced from the faucet through the aperture 313 and impinges on the ball 207 and air is drawn through the slots 203 to mix with the water which is discharged with a mixture of air bubbles therein through the orifice 206.

The disks 310, 311, and 312 shown in Figs. 4, 5, and 6 are suitable for use with the devices shown in Figs. 2 and 3; however, instead of the one central opening 11 shown in the disk of Figs. 2 and 6, a plurality of apertures such as apertures 311a and 312a of the disks 310 and 311 shown in Figs. 4 and 5 are provided. The apertures 311a are directed to converge inwardly toward the ball and the apertures 312a are likewise directed to converge inwardly so that a stream of water therethrough will be directed inwardly whereby the water is directed to impinge directly on the ball.

Under some applications, it has been found advantageous to provide the disk with a plurality of openings. In the embodiment of the invention shown in Fig. 11, I show a disk 511 which is adapted for use with a ball similar to ball 7 for aerating the water in a shower head or the like. The disk 511 has an aperture 512 which has jagged edges 513 adapted to discharge water from a shower with bubbles disposed therein.

In Fig. 13, I show a screen 150 suitable for use in a bubble faucet attachment similar to those shown.

In the embodiment of the aerator shown in Figs. 14 and 15, I show a faucet 701 of a conventional design having a counterbore 702 therein terminating in a ledge 703. A gasket 704 is provided to seat on the counterbore 702 and an apertured washer 705 thrusts against the gasket 704 to provide a seal against leakage. A central aperture 706 is provided in the washer 705. The spherical ball 707 has the legs 708 integral therewith which may be made of flat material and attached to the ball 707 at 709 and terminating in ends 710 and 711. The ends 710 are adapted to rest against the lower face of the washer 705 and the lower ends 711 can rest against the inner edge 713 of the collar 714 or the legs could rest against the screen 715. The lower end of the faucet 701 is threaded at 716 to receive the internal threads of the collar 714.

When the faucet is assembled as shown in Fig. 14, water from the faucet 701 flows through the aperture 706, impinges on the ball 707 and is, thereby, dispersed whereupon it combines with air flowing through the slots 720 and the water mingled with the air flows through the screen 715 and a stream of water combined with air results. Further, the device may be used with a kitchen sink sprayer or in a shower head.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. An aerating device for liquids comprising a hollow body member having an inlet and an outlet adapted to be attached to a conduit, a partition in said hollow of said body having an orifice, a support on said body, a sphere shaped member resting and free to rotate on the upstream side of said support between said support and said partition in said body member on the outlet side of said partition, and apertures in the sides of said body member on the outlet side of said orifice whereby air is admitted and is dispersed in the liquid flowing through said body member.

2. The aerating device recited in claim 1 wherein said support in said body member comprises a circumferentially disposed member at the outlet end and said sphere shaped member has legs thereon resting on said circumferentially disposed member.

3. The aerating device recited in claim 1 wherein the aperture in said partition has jagged edges.

4. An aerating device comprising a hollow body member having an inlet and an outlet, a ball member, a support member in said body member attached thereto on the side thereof remote from said inlet and free to move thereon, an apertured washer supported on said support member, means supporting said ball member on the outlet side of said washer, and apertures in said body member on the outlet side of said washer whereby air is admitted to aerate liquid flowing through said washer aperture and impinging on said ball member.

5. The aerating device recited in claim 4 wherein said means for supporting said ball comprises spaced ledges projecting inwardly from said body member.

6. The aerating device recited in claim 4 wherein a plurality of apertures are provided in said washer.

7. The aerating device recited in claim 6 wherein said apertures are directed to converge inwardly on said ball.

References Cited in the file of this patent

UNITED STATES PATENTS

| | | |
|---|---|---|
| 1,912,113 | Aghnides | May 30, 1933 |
| 2,508,827 | Holden | May 23, 1950 |
| 2,541,854 | Bachli et al. | Feb. 13, 1951 |
| 2,565,554 | Goodrie | Aug. 28, 1951 |
| 2,593,454 | Hyser | Apr. 22, 1952 |
| 2,633,343 | Aghnides | Mar. 31, 1953 |
| 2,643,104 | Holden | June 23, 1953 |
| 2,657,024 | Reinecke | Oct. 27, 1953 |
| 2,664,278 | Aghnides | Dec. 29, 1953 |
| 2,707,624 | Shames et al. | May 3, 1955 |
| 2,721,089 | Shames | Oct. 18, 1955 |